Patented Sept. 9, 1930

1,775,605

UNITED STATES PATENT OFFICE

HUGO SCHWEITZER, OF WIESDORF-ON-THE-RHINE, GERMANY, ASSIGNOR TO GENERAL ANILINE WORKS, INC., OF NEW YORK, N. Y., A CORPORATION OF DELAWARE

NEW AZO DYESTUFFS

No Drawing. Application filed December 16, 1927, Serial No. 240,613, and in Germany December 13, 1926.

The present invention concerns new and valuable azo dyestuffs and a process of preparing same, more particularly it relates to the azo dyestuffs which can be obtained by the treatment of an o-hydroxy-azo dyestuff with chlorosulfonic acid or an ester thereof. The process is carried out with the addition of a tertiary amine e. g. pyridine, dimethylaniline or other similar bases. The new dyestuffs are presumed to possess the form of ester like compounds of sulfuric acid and o-hydroxy-azo dyestuffs and are much more easily soluble in water than the original dyestuffs. They have the further great advantage that they can be treated either in substance or on the fiber with metallic salts, thus producing complex metal compounds, which are distinguished by very good fastness properties.

They are generally dark powders soluble in water with a yellowish to blue coloration and in concentrated sulfuric acid with an orange to blue coloration. In a free form they have most probably the following general formula:

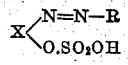

X meaning an aromatic nucleus which may be substituted and R an azo dyestuff component, the O.SO$_2$OH group standing in ortho-position to the azo group. The new products yield upon reduction with stannous chloride and hydrochloric acid an ortho-aminophenol and an aromatic amine.

The following examples will illustrate my invention:

*Example 1.*—25 grams of the o-hydroxy-azo-dyestuff obtainable by coupling in alkaline solution diazotized 4-chloro-2-aminophenol with β-naphthol are added at 20° C. to a mixture of 120 grams of chlorobenzene, 120 grams of pyridine and 14 parts by weight of chlorosulfonic acid and heated for 4 hours to 50–60° C. with continuous stirring. The mixture is then poured into a solution of 75 grams of calcined sodium carbonate in 300 cc. of water and the chlorobenzene and pyridine are then distilled off by means of steam. The new dyestuff crystallizes from the remaining liquid. It is filtered and purified by recrystallization from water. It has in the form of its sodium salt most probably the formula:

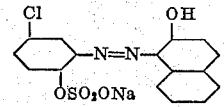

It is a brownish-red powder dyeing wool in orange shades, which are converted by after-chroming into fast reddish brown shades; upon reduction with stannous chloride and hydrochloric acid 4-chloro-2-aminophenol and 1-amino-2-naphthol result, the sulfuric acid of the ester being split off.

*Example 2.*—25 grams of the dyestuff obtainable by coupling in alkaline solution diazotized 5-nitro-2-amino-phenol with 2-naphthol-3-carboxylic acid are treated with chlorosulfonic acid as described in Example 1. The reaction product is isolated and reduced in 2 liters of water with 55 cc. of a solution of sodium sulfide (1 kg. of crystalline sodium sulfide in 2 liters of water), the dyestuff, now containing an amino-group, is isolated by salting out and then converted by the usual methods into a symmetrical urea by means of phosgene. The product is worked up in the customary manner and dyes cotton in red-violet shades, which by treatment with copper salts are converted into fast blue-violet shades. It has most probably in the shape of its sodium salt the following formula:

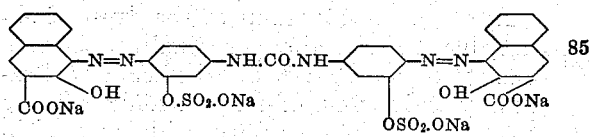

Upon reduction with stannous chloride and hydrochloric acid 4.4′-diamido-3.3′-dihydroxydiphenylurea and 1-amino-2-naphthol-3-carboxylic acid result, the sulfuric acid of the ester being split off.

*Example 3.*—25 grams of the dyestuff obtainable by coupling in alkaline solution diazotized 5-nitro-2-amino-1-phenol with 1-phenyl-3-methyl-5-pyrazolone are treated with chlorosulfonic acid as described in Examples 1 and 2. The isolated dyestuff is reduced with sodium sulfide and then converted into the symmetrical urea by means of phosgene, as described in Example 2. The new dyestuff dyes cotton in orange shades, which by treatment with copper salts are converted into fast red shades. It has in the form of its sodium salt the following formula:

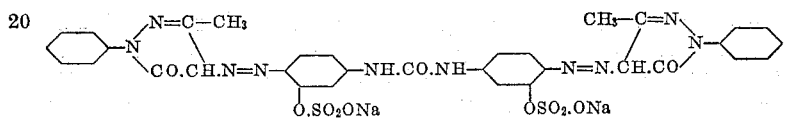

Upon reduction with stannous chloride and hydrochloric acid 4.4'-diamino-3.3'-dihydroxydiphenylurea and 1-phenyl-3-methyl-4-amido-5-pyrazolone result.

*Example 4.*—25 grams of the dyestuff obtainable by coupling in alkaline solution diazotized 5-nitro-2-aminophenol with 2-benzoylamino-5-naphthol-7-sulfonic acid are treated as is stated in Example 1 with chlorosulfonic acid. The resulting dye is reduced with sodium sulfide and treated with phosgene. It has in the form of its sodium salt most probably the formula:

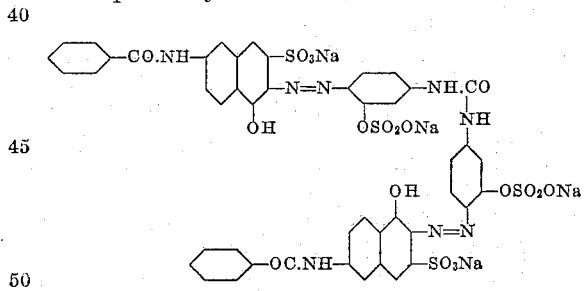

It is a dark powder soluble in water and dyeing cotton bluish-red shades. Upon reduction with stannous chloride and hydrochloric acid 4.4'-diamino-3.3'-dihydroxydiamido-diphenylurea and 2-benzoylamino-6.5-aminonaphthol-7-sulfonic acid result.

*Example 5.*—25 grams of the dyestuff obtainable by coupling in alkaline solution diazotized 5-nitro-2-amino-1-phenol with 2-benzoylamino-8-naphthol-6-sulfonic acid are treated with chlorosulfonic acid as stated in Example 1. The dye is isolated, reduced with sodium sulfide and treated with phosgene.

It is a dark powder having as sodium salt most probably the following formula:

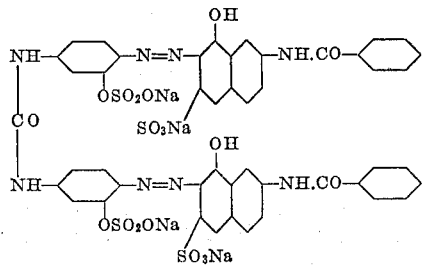
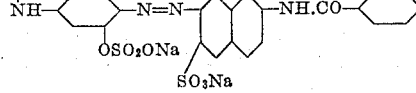

Upon reduction with stannous chloride and hydrochloric acid 4-4'-diamino-3.3'-dihydroxydiphenyl-urea and 2-benzoylamino-7-amino-8-naphthol-6-sulfonic acid result. It dyes cotton a red violet which by afterchroming is converted into a blue-violet shade fast to washing and to light.

I claim:

1. In the process for the manufacture of azo-dyestuffs the step which comprises treating an o-hydroxy-azo dyestuff with a compound of the group comprising chlorosulfonic acid and an ester thereof in the presence of a tertiary amine.

2. In the process for the manufacture of azo-dyestuffs the step which comprises treating an o-hydroxy-azo dyestuff with chlorosulfonic acid in the presence of pyridine.

3. In the process for the manufacture of azo-dyestuffs the step which comprises treating the dyestuff obtainable by coupling in an alkaline solution diazotized 5-nitro-2-amino-1-phenol with 1-phenyl-3-methyl-5-pyrazolone with chlorosulfonic acid in the presence of pyridine.

4. The new azodyestuffs which can be obtained by treating an ortho-hydroxyazodyestuff with a compound of the group comprising chlorosulfonic acid and an ester thereof in the presence of a tertiary amine, being generally dark powders soluble in water with a yellowish to blue coloration and in concentrated sulfuric acid with orange to blue coloration having in a free form most probably the following general formula:

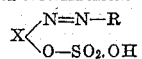

X meaning an aromatic nucleus which may be substituted and R an azo dyestuff component, the O.SO₂OH group standing in ortho-position to the azo group yielding upon treatment with stannous chloride and hydrochloric acid are ortho-aminophenol and an aromatic amine.

5. As a new product the azodyestuff of the formula:

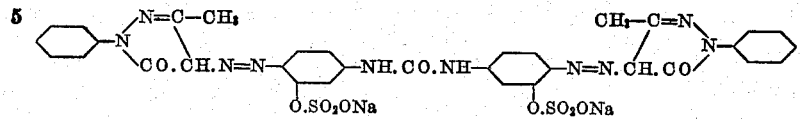

dyeing cotton in orange shades, which by treatment with copper salts are converted into fast red shades, yielding upon reduction with stannous chloride and hydrochloric acid 4.4′-diamino-3.3′-dihydroxydiphenylurea and 1-phenyl-3-methyl-4-amino-5-pyrazolone.

6. As a new product of manufacture fabrics dyed fast red to blue shades with an azo dyestuff of the general formula:

wherein X stands for an aromatic nucleus which may be substituted, and R stands for an azo dyestuff component, the $O.SO_2OH$ group standing in ortho-position to the azo group and treated with a compound of the group comprising copper and chromium salts after the dyeing process.

7. As a new product of manufacture fabrics dyed fast red shades with the azo dyestuff of the formula:

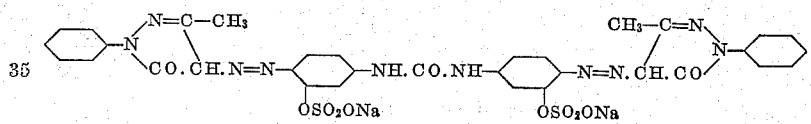

and treated with a copper salt after the dyeing process.

In testimony whereof I have hereunto set my hand.

HUGO SCHWEITZER.